United States Patent [19]
Larkin et al.

[11] Patent Number: 5,540,048
[45] Date of Patent: Jul. 30, 1996

[54] CONTINUOUSLY VARIABLE HYDROSTATIC TRANSMISSION INCLUDING A PULSE WIDTH MODULATION RATIO CONTROLLER

[75] Inventors: Robert F. Larkin, Pittsfield; William R. Kerr, Peru, both of Mass.

[73] Assignee: Martin Marietta Corporation, King of Prussia, Pa.

[21] Appl. No.: 380,269

[22] Filed: Jan. 30, 1995

[51] Int. Cl.[6] .............................. F16D 39/00; F15B 15/17
[52] U.S. Cl. .................. 60/327; 60/492; 91/415; 91/459
[58] Field of Search .................... 91/165, 166, 415, 91/459, 463, 464, 465, DIG. 4; 60/487, 490, 491, 492, 327

[56] References Cited

U.S. PATENT DOCUMENTS

| | | |
|---|---|---|
| 1,648,000 | 11/1927 | Lee . |
| 2,832,198 | 4/1958 | Pichon ............................ 60/53 |
| 2,946,193 | 7/1960 | Chittenden ...................... 60/491 X |
| 3,175,363 | 3/1965 | Molly .............................. 60/53 |
| 3,204,411 | 9/1965 | Stockton ......................... 60/53 |
| 3,209,911 | 9/1965 | Stockton ......................... 60/492 |
| 3,291,068 | 12/1966 | Wiggermann .................... 103/162 |
| 3,479,924 | 11/1969 | Ferguson ......................... 91/165 |
| 3,561,212 | 2/1971 | Pinkerton et al. ............... 60/492 |
| 3,601,981 | 8/1971 | Ifield .............................. 60/19 |
| 3,602,105 | 8/1971 | Slusher ........................... 91/483 |
| 3,654,761 | 4/1972 | Eickmann ........................ 60/53 |
| 3,740,954 | 6/1973 | Young ............................. 60/489 |
| 3,886,742 | 6/1975 | Johnson .......................... 60/490 X |
| 4,450,753 | 5/1984 | Basrai et al. .................... 91/465 X |
| 4,493,189 | 1/1985 | Slater ............................. 60/489 |
| 4,495,768 | 1/1985 | Valavaara ........................ 60/414 |
| 4,813,339 | 3/1989 | Uno et al. ....................... 91/459 |
| 4,901,529 | 2/1990 | Iino ................................ 60/489 |
| 4,932,311 | 6/1990 | Mibu et al. ..................... 91/459 X |
| 4,951,468 | 8/1990 | Sasajima et al. ................ 91/459 X |
| 5,423,183 | 6/1995 | Folsom ........................... 60/492 |

FOREIGN PATENT DOCUMENTS

| | | | |
|---|---|---|---|
| 1038364 | 6/1952 | Germany ......................... | 60/492 |
| 2113310 | 8/1983 | United Kingdom ............... | 91/459 |

*Primary Examiner*—Hoang Nguyen
*Attorney, Agent, or Firm*—Robert A. Cahill; Geoffrey H. Krauss

[57] ABSTRACT

A controller for changing the ratio of a continuously variable hydrostatic transmission, as determined by the angular position of a swashplate, including an actuator having a cylinder slidingly receiving a piston to define a pair of chambers. A pair of solenoid valves, each configured to connect a respective chamber selectively to sump pump pressure or atmospheric pressure, are energized with a stream of pulses to create differential fluid pressures in the chambers, thereby producing movement of the piston; the piston movement being linked to the swashplate to produce a corresponding adjustment of the swashplate angular position. The rate of change of the swashplate angular position is controlled by pulse width modulating the pulse stream.

13 Claims, 1 Drawing Sheet

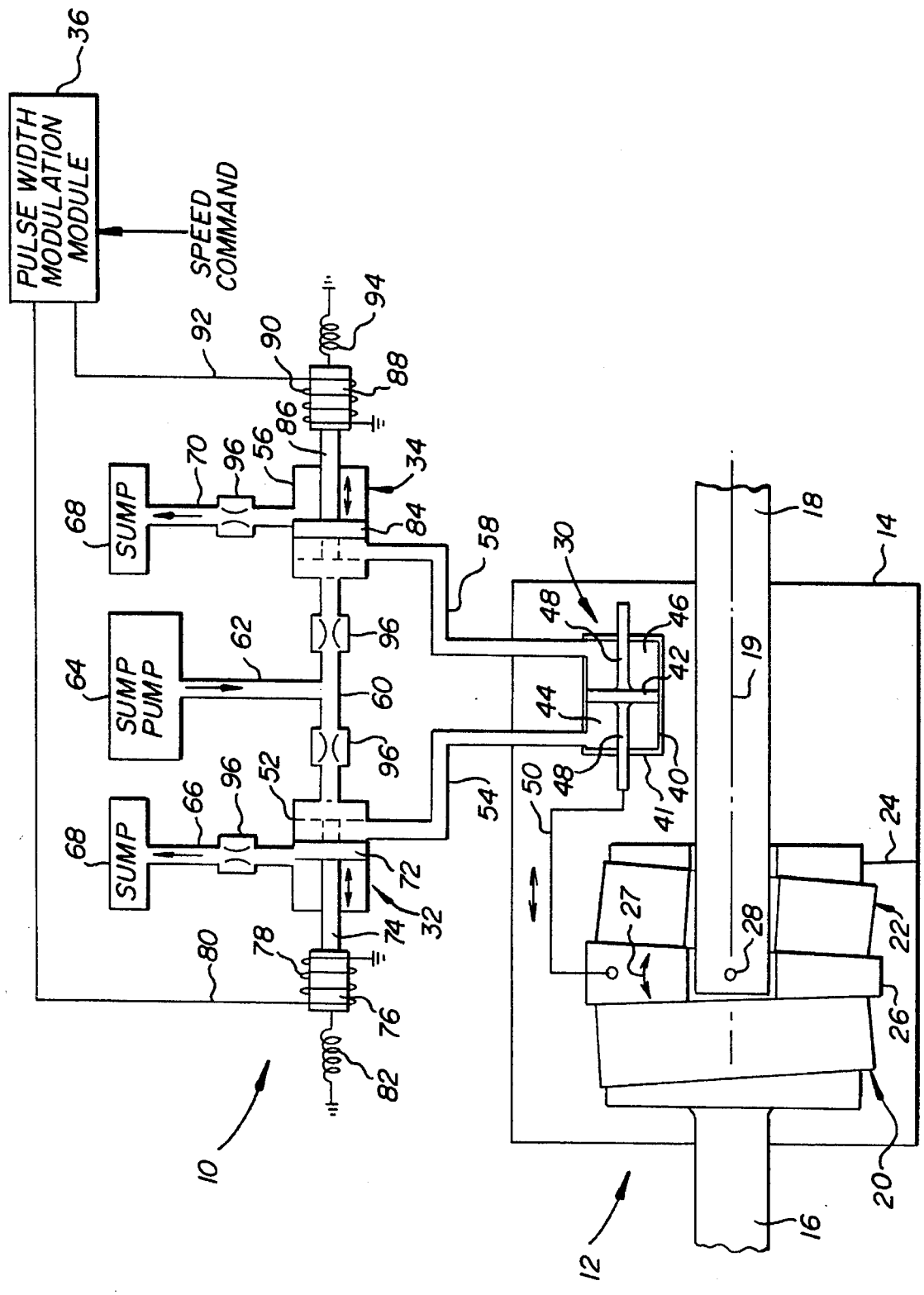

CONTINUOUSLY VARIABLE HYDROSTATIC TRANSMISSION INCLUDING A PULSE WIDTH MODULATION RATIO CONTROLLER

REFERENCE TO RELATED APPLICATIONS

The invention disclosed in this application has particular, but not necessarily limited application to the continuously variable hydrostatic transmissions disclosed in copending U.S. patent applications, Ser. Nos. 08/093,192, filed Jul. 13, 1993 and now U.S. Pat. No. 5,423,183, issued Jun. 13, 1995; 08/333,688, filed Nov. 3, 1994 (now allowed); 08/342,472, filed Nov. 21, 1994; and 08/380,276, filed Jan. 30, 1995, filed concurrently herewith. The disclosures of these applications are incorporated herein by reference.

FIELD OF THE INVENTION

The present invention relates to hydraulic machines and, more particularly, to hydrostatic transmissions capable of transmitting power from a prime mover to a load at continuously (infinitely) variable transmission ratios.

BACKGROUND OF THE INVENTION

The continuously variable hydrostatic transmissions disclosed in the cited copending applications include a hydraulic pump unit and a hydraulic motor unit positioned in opposed, axially aligned relation with an intermediate, wedge-shaped swashplate. The pump unit is connected to an input shaft driven by a prime mover, while the motor unit is grounded to the stationary machine housing. An output shaft, coaxial with the input shaft and drivingly coupled to a load, is connected to the swashplate. When the pump unit is driven by the prime mover, hydraulic fluid is pumped back and forth between the pump and motor units through ports in the swashplate. As a result, three torque components, all acting in the same direction, are exerted on the swashplate to produce output torque on the output shaft for driving the load. Two of these torque components are a mechanical component exerted on the swashplate by the rotating pump unit and a hydromechanical component exerted on the swashplate by the motor unit. The third component is a pure hydrostatic component resulting from the differential forces created by the fluid pressures acting on circumferentially opposed end surfaces of the swashplate ports, which are of different surface areas due to the wedge shape of the swashplate.

To change transmission ratio, the angular orientation of the swashplate relative to the axis of the output shaft is varied by a ratio controller. Since the transmission ratio, i.e., ratio of input speed to output speed, is continuously variable between 1:0 and 1:1, the prime mover can run at a constant speed set essentially at its most efficient operating point. The availability of a 1:0 (neutral) transmission ratio setting eliminates the need for a clutch. As is disclosed in cited application Ser. No. 08/342,472, the swashplate can be positioned to angular orientations beyond the 1:0 ratio setting to provide limited infinitely variable speed drive in a reverse direction, as well as to angular orientations beyond the 1:1 setting to provide a limited, infinitely variable, overdrive speed range. Significantly, reverse drive is available without need for a reversing gear mechanism.

Unlike conventional, continuously variable hydrostatic transmissions, wherein hydraulic fluid flow rate increases proportionately with increasing transmission ratio such that maximum flow rate occurs at the highest transmission ratio setting, the flow rate in the transmissions disclosed in the cited applications reaches a maximum at a midpoint in the ratio range and then progressively decreases to essentially zero at the 1:1 transmission ratio setting. Thus, losses due to hydraulic fluid flow are reduced, and the annoying whine of conventional hydrostatic transmissions at high ratios is avoided. By virtue of the multiple torque components exerted on the swashplate, the decreasing hydraulic fluid flow in the upper half of the output speed range, and the capability of accommodating a prime mover input operating at or near its optimum performance point, the hydraulic machines of the cited U.S. patent applications have a particularly advantageous application as a highly efficient, quiet, continuously variable hydrostatic transmission in vehicular drive trains.

SUMMARY OF THE INVENTION

An objective of the present invention is to provide an improved ratio controller for controlling a hydrostatic transmission to achieve continuously variable ratios of input versus output speeds.

A further objective of the present invention is to provide an improved ratio controller for effectively controlling the rate of ratio change of a continuously variable hydrostatic transmission in response to speed command signals.

An additional objective of the present invention is to provide an improved ratio controller for changing the swashplate angle in continuously variable hydrostatic transmissions of the type disclosed in the cited U.S. patent applications.

To achieve these objectives, the ratio controller of the present invention, in its application to a continuously variable hydrostatic transmission including an input shaft for receiving input torque from a prime mover, an output shaft for imparting driving torque to a load, a hydraulic pump unit, a hydraulic motor unit, and a swashplate operatively positioned between the pump unit and the motor unit, comprises, in combination, an actuator including a cylinder and a piston disposed in the cylinder to define first and second chambers, the actuator operatively coupled to the swashplate; a first fluid valve having a quiescent valve position connecting the first chamber to a source of hydraulic fluid pressure and an actuated valve piston venting the first chamber; a second fluid valve having a quiescent valve position connecting the second chamber to the fluid pressure source and actuated valve position venting the second chamber; a module, responsive to speed commands, for selectively actuating the first and second solenoid valves to create differential fluid pressures in the first and second chambers and thereby produce controlled relative motion of the cylinder and piston; and means for translating the relative motion of the cylinder and piston into ratio-changing movement of the swashplate.

Further in accordance with these objectives, the present invention provides a method for controlling input-to-output speed ratio of a continuously variable hydrostatic transmission having a swashplate operatively positioned between a hydraulic pump unit and a hydraulic motor unit, the method including the steps of linking an actuator to the swashplate, the actuator including a piston received in a cylinder to define first and second chambers; providing a source of pressurized hydraulic fluid; providing a first fluid valve having a quiescent valve position connecting the first chamber to the source of pressurized hydraulic fluid and an actuated valve position venting the first chamber; providing a second fluid valve having a quiescent valve position connecting the second chamber to the pressurized hydraulic fluid source and an actuated valve position venting the second chamber; setting a transmission ratio by maintaining the first and second fluid valves in their quiescent valve positions to equalize fluid pressures in the first and second chambers; changing the transmission ratio by shifting one of the first and second valves to its actuated position, thereby creating differential fluid pressures in the first and second chambers to produce relative motion of the piston and cylinder; and translating the relative piston and cylinder motion into transmission ratio-changing movement of the swashplate.

Additional features, advantages, and objectives of the invention will be set forth in the description which follows and in part will be apparent from the description, or may be learned by practice of the invention. The objectives and advantages of the present invention will be realized and attained by the apparatus and method particularly pointed out in the following written description and the appended claims, as well as in the accompanying drawing.

It will be understood that both the foregoing general description and the following detailed description are exemplary and explanatory and are intended to provide further explanation of the invention as claimed.

The accompanying drawing is intended to provide a further understanding of the invention and is incorporated in and constitutes a part of the specification, illustrates a preferred embodiment of the invention and, together with the description, serves to explain the principles of the invention.

BRIEF DESCRIPTION OF THE DRAWINGS

The sole FIGURE of the drawing is a schematic diagram of a ratio controller according to an embodiment of the present invention in its application to a continuously variable hydrostatic transmission.

DETAILED DESCRIPTION OF THE PREFERRED EMBODIMENT

The transmission ratio controller in accordance with a preferred embodiment of the present invention, as generally indicated at 10 in the drawing, is illustrated in its application to a continuously variable transmission, generally indicated at 12 and of the type disclosed in the cited U.S. patent applications. Thus, as diagrammatically illustrated in the drawing, transmission 12 includes a housing 14 in which are journaled an input shaft 16 and an output shaft 18 in generally end-to-end, coaxial relation. Input shaft 16 applies input torque from a prime mover (not shown) to a hydraulic pump unit, generally indicated at 20, while a hydraulic motor unit, generally indicated at 22, is grounded to housing 14, as indicated at 24. Operatively positioned between pump unit 20 and motor unit 22 is a wedge-shaped swashplate 26, which is pivotally connected to the output shaft in torque coupled relation as indicated at 28. As described in the cited U.S. patent applications, swashplate 26 is provided with ports through which hydraulic fluid is pumped back and forth between the hydraulic pump and motor units to exert torque components on the swashplate, which are coupled to output shaft 18 as output torque for application to driving wheels of a vehicle (not shown). As also described in the cited U.S. patent applications, transmission ratio, i.e., input speed on input shaft 16 versus output speed on output shaft 18, is determined by swashplate angle, that is, the angular orientation of swashplate 26 relative to the output shaft axis 19. Thus, to change transmission ratio, swashplate 26 is pivoted about its pivotal connection 28 to output shaft 18, as indicated by arrow 27, to decrease ratio (clockwise) or to increase ratio (counterclockwise).

Ratio controller 10 comprises a hydraulic actuator 30, positioned within housing 14, a pair of solenoid valves, generally indicated at 32 and 34, for connecting chambers of the actuator to either a common source of hydraulic fluid under pressure or to atmosphere, and a module 36 connected to selectively energize the solenoid valves in response to speed command signals.

Actuator 30 is illustrated as comprising a cylinder 40 in which a piston 42 is slidingly received to define a pair of opposed chambers 44 and 46. Piston 42 is mounted for reciprocating motion within cylinder 40 by opposed piston rods 48 extending through hermetically sealed openings in the cylinder endwalls. The exterior end of one piston rod 48 is linked, as schematically indicated at 50, to translate reciprocating movement of piston 42 into bidirectional angular movement of swashplate 26 about its pivotal connection 28 to output shaft 18.

It is to be understood that the illustrated actuator structure is exemplary only. It may take a variety of forms, such as, for example, the various forms illustrated in the cited U.S. patent applications. For example, as illustrated in cited application Ser. No. 08/333,668, piston 42 may be fixedly positioned, while cylinder 40 undergoes reciprocating motion and is thus linked to swashplate 26. Cited application Ser. No. 08/342,472 illustrates that piston 42 may represent a pair of spherical bearings that respectively mount pump unit and motor unit cylinder blocks. Coordinated axial movements of the spherical bearings exert pivoting forces on the swashplate via the cylinder blocks. Link 50 may take the form of large diameter cylindrical actuating member that reaches around the pump or motor unit to exert pivoting forces on the swashplate, as illustrated in cited application Ser. No. 08/093,192. Alternatively, the link 50 may include a cylindrical actuating member that closely surrounds output shaft 18, is illustrated in cited application Ser. No. 08/333, 688. Cited application Ser. No. (35-OR-962) illustrates link 50 may represent a hydraulically actuated piston incorporated in the output shaft.

Returning to consideration of actuator 30 in its form illustrated herein, chamber 44 is connected to a valve chamber 52 of solenoid valve 32 via a fluid line 54, while chamber 46 is connected to a valve chamber 56 of solenoid valve 34 by a fluid line 58. Valve chambers 52 and 56 are connected in common via fluid lines 60 and 62 to a source of hydraulic fluid pressure, preferable makeup or control pressure available at the output of a sump pump 64. Valve chamber 52 is also vented, via fluid line 66, to atmospheric pressure, such as exists in a transmission sump 68. Valve chamber 56 is likewise vented to sump 68 via fluid line 70.

Solenoid valve 32 also includes a valve member 72 slidingly received in valve chamber 52. A stem 74 extends from valve member 72 externally of valve chamber 52 and is terminated by a solenoid plunger 76. A solenoid coil 78, wound on plunger 76, is grounded at one end and connected at its other end by a lead 80 extending to control module 36. Valve member 72 is biased to an illustrated quiescent position by a spring 82, such that actuator chamber 44 is normally in fluid communication with sump pump 64 via fluid lines 54, 60, and 62.

Solenoid valve 34 is constructed in the same manner as solenoid valve 32, and thus includes a valve member 84 slidingly received in valve chamber 56. A valve stem 86 extends from valve member 84 to a terminating solenoid plunger 88, about which a solenoid coil 90 is wound. The ungrounded end of coil 90 is connected to control module 36 by a lead 92. A spring 94 biases valve member 84 to its illustrated quiescent valve position, thereby connecting actuator chamber 46 in fluid communication with the sump pump output via fluid lines 58, 60, and 62.

From the foregoing description of ratio controller 10, it is seen that, while solenoid valves 32 and 34 are in their quiescent valve positions, actuator chambers 44 and 46 are filled with hydraulic fluid at a fluid pressure equal to the sump pump output pressure. Actuator piston 42 is thus fixed in position to set a particular swashplate angle. When a speed command inputted to control module 36 calls for an increase in transmission ratio, solenoid coil 78 of solenoid valve 32 is electrically energized to propel valve member 72 forwardly to a venting valve position illustrated in phantom line, thereby connecting actuator chamber 44 to sump 68 through fluid lines 54 and 66. The fluid pressure in actuator chamber 46, still connected to sump pump 64 by solenoid valve 34, now exceeds the fluid pressure in actuator chamber 44. Consequently, piston 42 is driven leftward to pivot swashplate 26 in the counterclockwise, ratio-increasing direction. When the swashplate has been pivoted to the commanded higher transmission ratio, control module 36 ceases energization of solenoid coil 78, and solenoid valve 32 is pulled back to its quiescent valve position by spring 82, reconnecting actuator chamber 44 to the sump pump 64. Fluid pressures in the actuator chambers equalize to fix the actuator piston position and set the swashplate position to the new, higher ratio setting.

When a speed input command calls for a reduction in transmission ratio, control module 36 energizes solenoid coil 90 to drive valve member 84 forwardly to its phantom line valve position, thereby venting actuator chamber 46 to sump 68. The fluid pressure in chamber 44 now exceeds the fluid pressure in actuator chamber 46, and actuator piston 42 is driven rightward as the volume of chamber 44 expands, while the volume of chamber 46 contracts. Swashplate 26 is pivoted in the clockwise direction to reduce transmission ratio. When the transmission ratio achieves a setting satisfying the reduced speed command, energization of solenoid valve 34 ceases, and spring 94 retracts valve member 84 to its solid line position reconnecting actuator chamber 46 to the sump pump output. Actuator chamber 46 is then pressurized to the same fluid pressure as actuator chamber 44, and the new position of actuator piston 42 is sustained to set the swashplate angle to the commanded, lower transmission ratio.

As illustrated, orifice restrictions 96 may be incorporated in fluid lines 60, 66, and 70 to adjust operating parameters of the fluid circuit by attenuating hydraulic fluid flow rate and thus avoiding abrupt fluid pressures changes in the actuator chambers. The restrictions also will alleviate the affects of fluid viscosity changes due to variations in operating temperature.

In accordance with a feature of the present invention, control module 36 is in the form of a pulse width modulator that generates a stream of pulses at a constant pulse rate or frequency (e.g. 16 Hz), wherein the pulse width (duty cycle) is varied in response to the input speed command. By varying the pulse duty cycle (ratio of pulse width to pulse period), the duration that one of the solenoid valve members 72 or 84 is in its phantom line position to vent chambers 44 or 46, respectively, the rate at which actuator piston 42 moves to change swashplate angle is varied accordingly. That is, at high pulse duty cycles, the rate of swashplate angle change is correspondingly high, and vice versa. Once the speed command is satisfied, the output pulse stream is stopped to set the swashplate angle at the commanded speed (transmission) ratio.

The capability of precisely controlling the rate of ratio change in transmission 12 using pulse width modulation energization of solenoid valves 32 and 34 is particularly advantageous in automotive applications. That is, ratio controller 10 can readily act not only to continuously match engine power to vehicle load, but also quickly react to such dynamic situation as sudden stops (fast ratio change) and heavy traffic conditions (slow ratio change).

While pulse width modulation of the solenoid energizations is preferred, it will be appreciated that frequency modulation of a stream of uniform width pulses could also be used.

It will be apparent to those skilled in the act that various modifications and variations can be made to the apparatus of the present invention without departing from the spirit of the invention. Thus, it is intended that the present invention be construed to cover modifications and variations thereof, provided they come within the spirit and scope of the appended claims and their equivalents.

What is claimed is:

1. A ratio controller for a continuously variable hydrostatic transmission including a hydraulic pump unit, a hydraulic motor unit, and a swash plate positioned between the hydraulic pump and motor units to accommodate flows of hydraulic fluid between the hydraulic pump and motor units, the ratio controller comprising, in combination:

an actuator including a cylinder and a piston disposed in the cylinder to define first and second chambers;

a first fluid valve having a quiescent valve position connecting the first chamber to a source of hydraulic fluid pressure and an actuated valve position venting the first chamber;

a second fluid valve having a quiescent valve position connecting the second chamber to the hydraulic fluid pressure source and an actuated valve position venting the second chamber;

a module responsive to command signals for controllably activating a selected one of the first and second fluid valves with a stream of electrical pulses to shift the selected fluid valve to its actuated position for the duration of each pulse, the selected fluid valve shifting back to its quiescent valve position for the duration of each interval between pulses, thereby creating differential fluid pressures in the first and second chambers to produce relative motion of the actuator piston and cylinder; and means for translating the relative motion of the actuator piston and cylinder into transmission ratio-changing movement of the swashplate.

2. The ratio controller defined in claim 1, wherein the module modulates one of the frequency and the width of the pulse stream to control a rate of transmission ratio-changing movement of the swashplate.

3. The ratio controller defined in claim 2, wherein the first and second fluid valves are solenoid valves, and the pulse stream is a current pulse stream.

4. The ratio controller defined in claim 3, wherein the module pulse width modulates the pulse stream.

5. The ratio controller of claim 1, further comprising fluid flow restrictors included in fluid lines connecting the first and second chambers to the hydraulic fluid pressure source and in fluid lines venting the first and second chambers.

6. A method for controlling the ratio of a continuously variable hydrostatic transmission including a swashplate operatively positioned between a hydraulic pump unit and a hydraulic motor unit, the method comprising the steps of:

linking an actuator to the swashplate, the actuator including a piston disposed in a cylinder to define the first and second chambers;

providing a source of pressurized hydraulic fluid;

providing a first solenoid fluid valve having an actuated valve position venting the first chamber and a quiescent valve position connecting the first chamber to the pressurized hydraulic fluid source;

providing a second solenoid fluid valve having an actuated valve position venting the second chamber and a quiescent valve position connecting the second chamber to the pressurized hydraulic fluid source;

setting the transmission ratio by maintaining the first and second solenoid valves in their quiescent valve positions to equalize fluid pressures in the first and second chambers and maintain a ratio-setting position of the swashplate;

changing the transmission ratio by energizing one of the first and second solenoid valves with a stream of electrical pulses to shift the one solenoid valve to its respective actuated valve position for the duration of each electrical pulse and to shift the one solenoid valve to its respective quiescent valve position for the interval between each electrical pulse, while maintaining the other of the first and second solenoid valves in its respective quiescent valve position, thereby creating differential fluid pressures in the first and second chambers to produce relative movement of the actuator cylinder and actuator piston; and translating the relative movement of the actuator cylinder and actuator piston into ratio-changing motion of the swashplate.

7. The method defined in claim 6, wherein the energizing step includes the step of modulating the pulse width of the pulse stream to vary the rate of ratio-changing motion of the swashplate.

8. The method defined in claim 7, further including the steps of terminating the pulse stream when the swashplate achieves a commanded transmission ratio-setting position.

9. A continuously variable hydrostatic transmission comprising:

a housing;

an input shaft journaled in the housing for receiving input torque from a prime mover;

an output shaft journaled in the housing for imparting output torque to a load;

a hydraulic pump unit driven by the input shaft;

a hydraulic motor unit grounded to the housing;

a wedge-shaped swashplate pivotally connected to the output shaft in torque coupled relation, the swashplate operatively positioned between the hydraulic pump and motor units and having ports accommodating transfer of hydraulic fluid between the hydraulic pump and motor units; and angular position of the swashplate relative to an axis of the output shaft determining a transmission ratio; and a controller including:

an actuator including a piston disposed in a cylinder to define first and second chambers, a first fluid valve having a quiescent valve position connecting the first chamber to a source of hydraulic fluid pressure and an actuated valve position venting the first chamber;

a second fluid valve having a quiescent valve position connecting the second chamber to the hydraulic fluid pressure source and an actuated valve position venting the second chamber;

a module responsive to command signals for controllably actuating a selected one of the first and second fluid valves with a stream of electrical pulses to shift the selected valve to its actuated position for the duration of each pulse, the selected fluid valve shifting back to its respective quiescent valve position for each interval between electrical pulses, thereby creating differential fluid pressures in the first and second chambers to produce relative motion of the actuator piston and cylinder; and means translating the relative motion of the actuator piston and cylinder into transmission ratio-changing angular movement of the swashplate.

10. The ratio controller defined in claim 9, wherein the module modulates one of the frequency and the width of the pulse stream to control a rate of transmission ratio-changing movement of the swashplate.

11. The ratio controller defined in claim 10, wherein the first and second fluid valves are solenoid valves, and the pulse stream is a current pulse stream.

12. The ratio controller defined in claim 11, wherein the module pulse width modulates the pulse stream.

13. The ratio controller of claim 12, further comprising fluid flow restrictors included in fluid lines connecting the first and second chambers to the hydraulic fluid pressure source and in fluid lines venting the first and second chambers.

* * * * *